United States Patent [19]

Dimroth et al.

[11] Patent Number: 4,563,519

[45] Date of Patent: Jan. 7, 1986

[54] ANTHRAQUINONE AZOPYRAZALONE COLORANTS

[75] Inventors: Peter Dimroth, Mannheim; Heinrich Kowarsch, Oberderdingen, both of Fed. Rep. of Germany

[73] Assignee: BASF Aktiengesellschaft, Ludwigshafen, Fed. Rep. of Germany

[21] Appl. No.: 522,688

[22] Filed: Aug. 12, 1983

[30] Foreign Application Priority Data

Aug. 12, 1982 [DE] Fed. Rep. of Germany ....... 3229953

[51] Int. Cl.[4] ........................ C09B 56/12; D06P 1/04; D06P 1/44

[52] U.S. Cl. ........................ 534/655; 106/23; 106/288 Q; 106/300; 106/308 Q; 526/218.1; 526/219

[58] Field of Search ........................ 260/162, 160, 161; 534/655

[56] References Cited

U.S. PATENT DOCUMENTS

| | | | |
|---|---|---|---|
| 1,855,289 | 4/1932 | Haller et al. | 260/162 |
| 2,040,927 | 5/1936 | Ellis et al. | 260/162 |
| 2,112,276 | 3/1938 | Ellis et al. | 260/162 X |
| 2,346,922 | 4/1944 | Johnson | 260/147 |
| 2,871,234 | 1/1959 | Bergstrom | 260/162 |
| 3,212,841 | 10/1965 | Stanley | 260/162 X |
| 3,320,233 | 5/1967 | Braun et al. | 260/192 |
| 3,954,398 | 5/1976 | Ramanathan | 260/160 X |

FOREIGN PATENT DOCUMENTS

| | | | |
|---|---|---|---|
| 1919081 | 4/1969 | Fed. Rep. of Germany | 360/160 X |
| 47-49167 | 11/1972 | Japan | 260/163 |
| 925859 | 5/1963 | United Kingdom | 260/162 |

*Primary Examiner*—Floyd D. Higel
*Attorney, Agent, or Firm*—Oblon, Fisher, Spivak, McClelland & Maier

[57] ABSTRACT

Compounds which, in one of the possible tautomeric forms, correspond to the general formula I

I

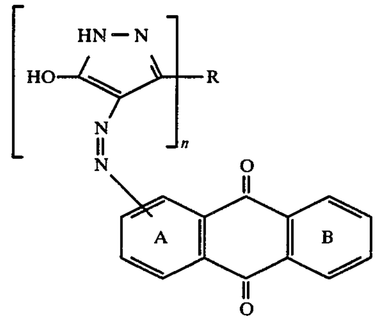

where n is 1 or 2 and, if n is 1, R is unsubstituted or substituted aryl or heteroaryl or, if n is 2, R is a bridge member, and the rings A and B can be further substituted, are outstanding colorants for surface coatings, printing inks or plastics.

17 Claims, No Drawings

ANTHRAQUINONE AZOPYRAZALONE COLORANTS

The present invention relates to compounds which, in one of their possible tautomeric forms, correspond to the formula

I

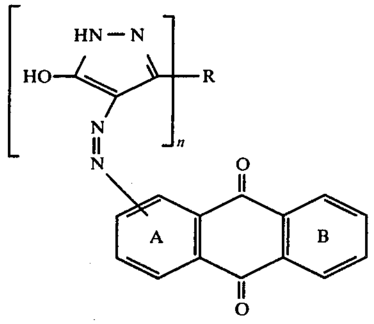

where n is 1 or 2 and, if n is 1, R is unsubstituted or substituted aryl or heteroaryl or, if n is 2, R is a bridge member, and the rings A and B can be further substituted.

Examples of substituents for ring A are fluorine, chlorine, bromine, nitro, methyl, ethyl, propyl, methoxy, ethoxy, phenoxy, acetyl, benzoyl, hydroxyl, methylamino, phenylamino, acetylamino, propionylamino, benzoylamino which is unsubstituted or substituted by chlorine, bromine, methyl or methoxy, carboxyl, methylmercapto and phenylmercapto.

Examples of substituents for ring B are chlorine, bromine, $C_1$–$C_4$-alkyl, $C_1$–$C_4$-alkoxy, nitro, benzoylamino and acetylamino.

If n is 1, examples of R are phenyl which is unsubstituted or substituted by fluorine, chlorine, bromine, $C_1$–$C^4$-alkyl, $C^1$–$C_4$-alkoxy, acetylamino, benzoylamino, nitro, acetoacetylamino, tetrachlorophthalimido or homophthalimido, naphthyl which is unsubstituted or substituted by chlorine, bromine or acetyl and anthraquinonyl which is unsubstituted or substituted by chlorine, bromine, methyl, ethyl, nitro, acetyl or benzoyl.

If n is 2, examples of bridge members R are phenylene or naphthylene, each of which is unsubstituted or substituted by chlorine, bromine, methyl, ethyl, methoxy or ethoxy, and radicals of the formula:

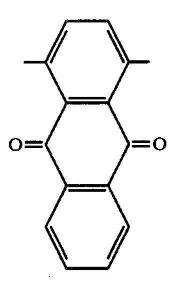

The preparation of the coupling components is known in principle, for example from: JA-7312461-R; JA-7249167-R; Liebigs *Annal. Chem.* 352, 158 (1907) and CAS-REGNR. 4860-93-9, and other compounds can be prepared in a similar manner. The compounds of the formula I essentially have orange to bluish violet shades and, because of their insolubility, are suitable as colorants. They have outstanding fastnesses, for example fastness to light, weathering, overlacquering and migration, and can be used for coloring surface coatings, plastics and printing inks.

Compounds of the formula I where a 1-aminoanthraquinone was used as the diazo component, n is 1 and R is unsubstituted or substituted phenyl or naphthyl are of particular importance. Preferred substituents for R are chlorine, bromine, methyl, ethyl, methoxy, ethoxy, acetyl, benzoylamino and nitro. Compounds where n is 2 and R is unsubstituted or substituted phenylene are also useful.

Examples of preferred substituents on the ring A are chlorine, bromine, benzoylamino, methyl, ethyl, acetyl and benzoyl, and preferred substituents on the ring B are bromine, chlorine, methyl, ethyl, acetyl, benzoyl and benzoylamino.

Compounds of the formula I can be prepared by reacting a diazonium compound of an amine of the formula

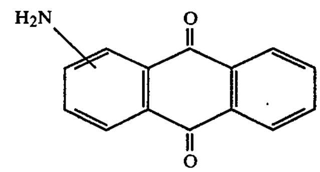

with a coupling component of the formula

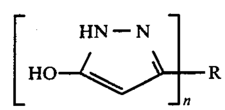

in a conventional manner. Details of the reactions can be found in the Examples, in which, unless indicated otherwise, parts and percentages are by weight.

EXAMPLE 1

22.4 parts of 1-aminoanthraquinone are introduced into a mixture of 46 parts of 96% strength sulfuric acid and 34 parts of 40% nitrosylsulfuric acid so that the temperature does not exceed 40° C., and the mixture is stirred at 40° C. for two hours. The solution is then stirred into 300 parts of ice and water, and the diazonium sulfate which has crystallized out is filtered off and washed with ice-water.

The water-moist diazonium bisulfate is then stirred with 600 parts of water and 10 parts of glacial acetic acid. A mixture of 16 parts of phenylpyrazolone, 600 parts of water and 16 parts of 50% strength sodium hydroxide solution is run into this solution at from +5° to +10° C. Stirring is continued at room temperature for two hours, and the precipitate is filtered off, washed with water and a little methanol and dried. 38.5 parts (=97% of theory) of an orange compound of the formula

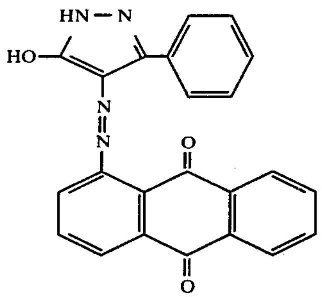

are obtained. The colorant can be used directly in this form for coloring printing inks, surface coatings and plastics.

A colorant form of even better covering power and fastness to weathering is obtained if, for example, 10 parts of colorant are stirred in 100 parts of dimethylformamide at 100° C. for three hours, filtered off with suction, washed with methanol and dried. Yield: 9.3 parts.

The colorations have pure shades with outstanding fastness to light and weathering. This also applies to the colorations obtained with the colorants described in the Examples which follow.

| Example | Coupling component | Diazo component | Shade |
|---|---|---|---|
| 2 | 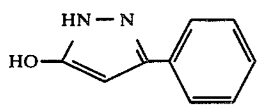 | 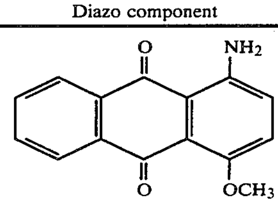 | Red |
| 3 | " | 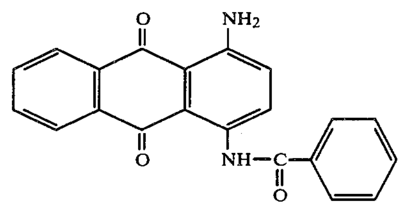 | Brownish red |
| 4 | " | 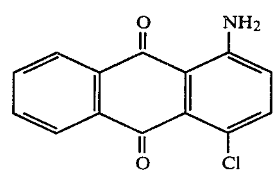 | Orange |
| 5 | " | 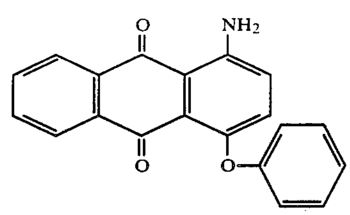 | Violet |
| 6 | " | 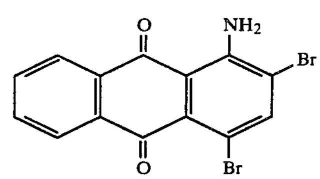 | Orange |
| 7 | " | 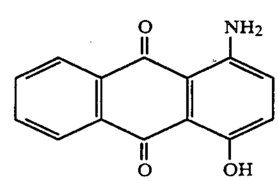 | Violet |

-continued
| Example | Coupling component | Diazo component | Shade |
|---|---|---|---|
| 8 | ″ | 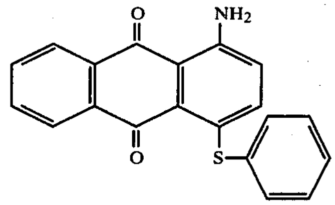 | Bluish red |
| 9 | ″ | 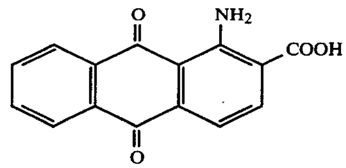 | Brown |
| 10 | ″ | 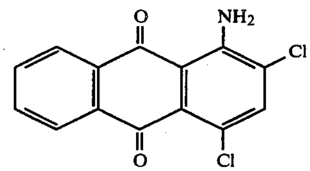 | Yellowish orange |
| 11 | 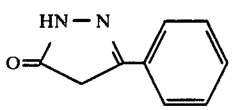 | 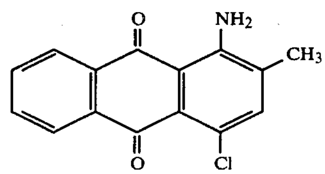 | Orange |
| 12 | ″ | 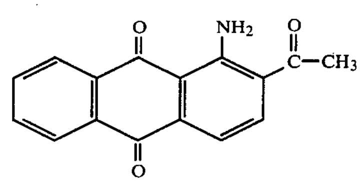 | Orange |
| 13 | ″ | 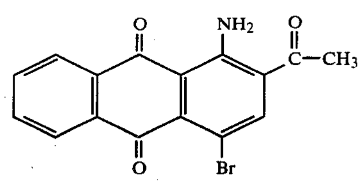 | Yellowish orange |
| 14 | 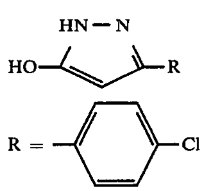 | 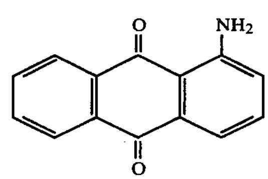 | Yellowish orange |
| 15 | 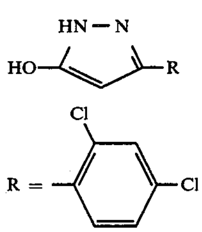 | ″ | Orange |

-continued
| Example | Coupling component | Diazo component | Shade |
|---|---|---|---|
| 16 | 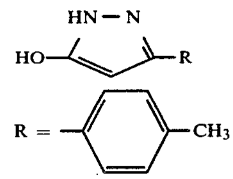 | " | Reddish orange |
| 17 | 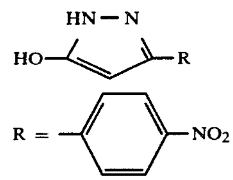 | " | Orange |
| 18 | 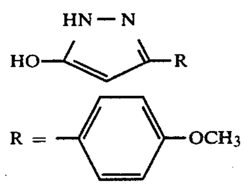 | " | Reddish orange |
| 19 | 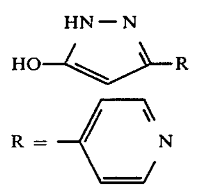 | " | Reddish yellow |
| 20 | 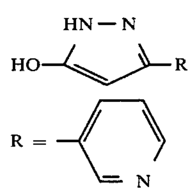 | " | Yellowish orange |
| 21 | 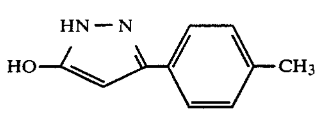 | 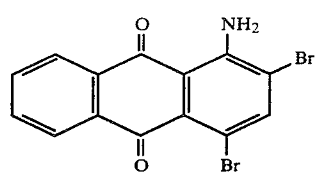 | Reddish orange |
| 22 | 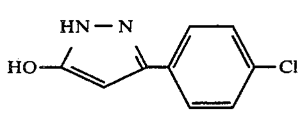 | 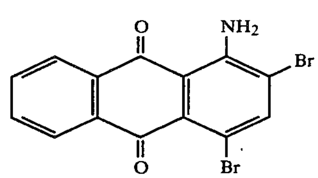 | Yellowish orange |
| 23 | 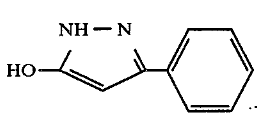 | 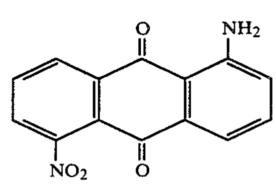 | Orange |

-continued

| Example | Coupling component | Diazo component | Shade |
|---|---|---|---|
| 24 | " | 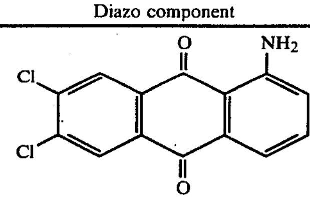 | Yellowish orange |
| 25 | " | 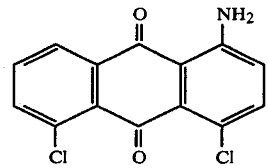 | Orange |

EXAMPLE 26

The water-moist diazonium bisulfate obtained from 25.8 parts of 1-amino-4-chloroanthraquinone as described in Example 1 is stirred with 12.1 parts of the coupling component of the formula

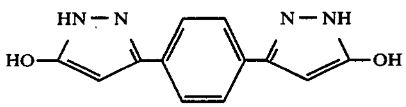

20 parts of pyridine and 400 parts of N-methylpyrrolidone at room temperature for 12 hours and at 130° C. for three hours. The precipitate is filtered off, washed with N-methylpyrrolidone and methanol and dried. 32 parts (=82% of theory) of a red colorant of the formula:

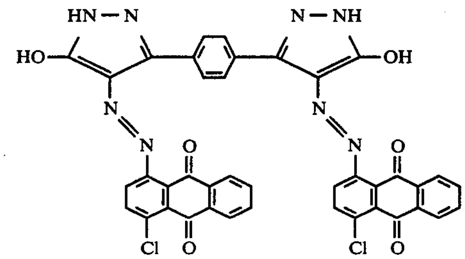

which is outstandingly fast to solvents and migration are obtained.

The colorants described in the Table which follows are prepared in a similar manner:

| Example | Coupling component | Diazo component | Shade |
|---|---|---|---|
| 27 | 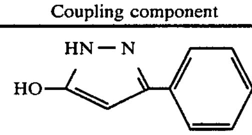 | 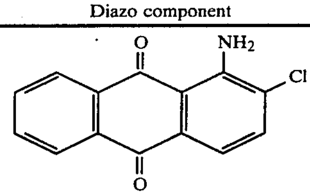 | Yellowish orange |
| 28 | " | 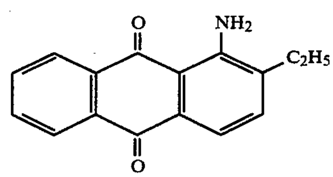 | Reddish orange |
| 29 | " | 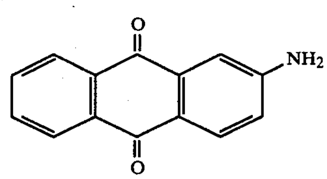 | Orange |
| 30 | " | 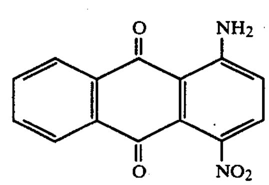 | Brownish red |

-continued
| Example | Coupling component | Diazo component | Shade |
|---|---|---|---|
| 31 | " | 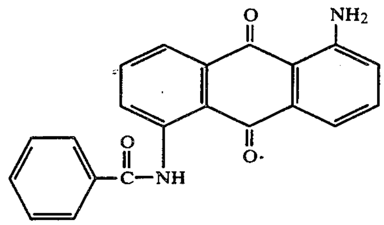 | Reddish orange |
| 32 | " | 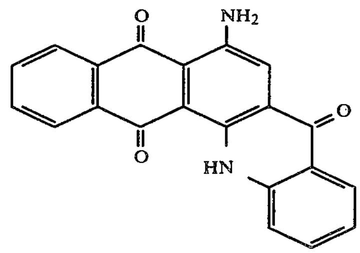 | Violet |
| 33 | 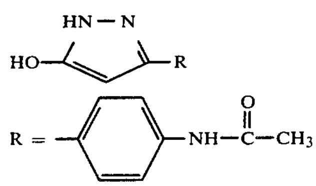 | 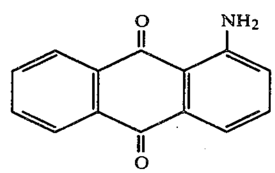 | Reddish orange |
| 34 | 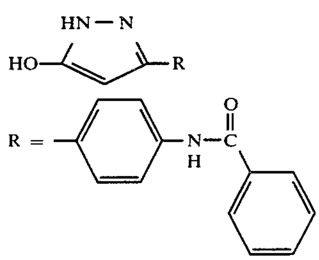 | " | Orange |
| 35 | 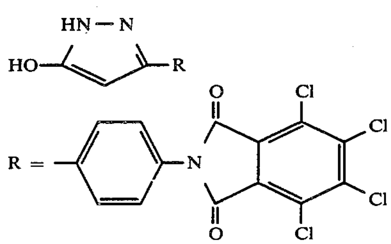 | " | Red |
| 36 | 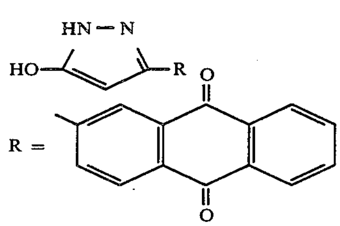 | " | Orange |

-continued
| Example | Coupling component | Diazo component | Shade |
|---|---|---|---|
| 37 | 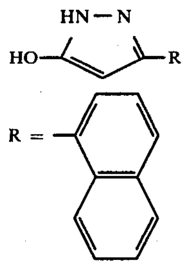 | " | Orange |
| 38 | 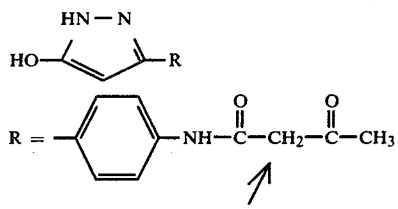 | 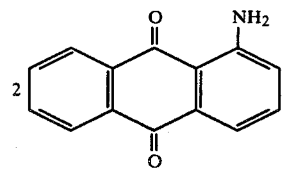 | Reddish yellow |
| 39 | 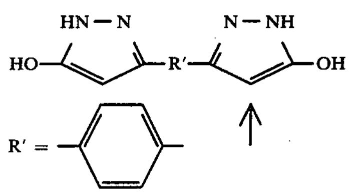 | " | Red |
| 40 | 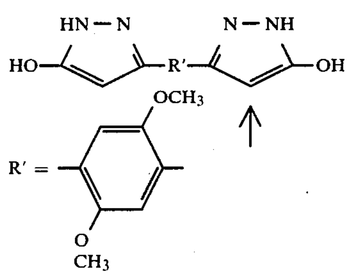 | " | Brown |
| 41 | 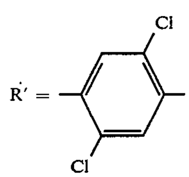 | " | Reddish orange |
| 42 | 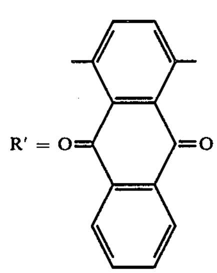 | " | Red |
| 43 | 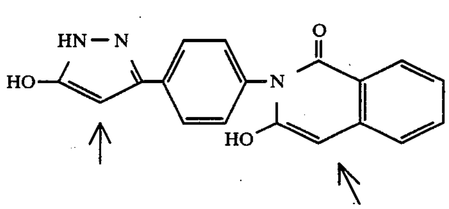 | " | Reddish yellow |

-continued

| Example | Coupling component | Diazo component | Shade |
|---|---|---|---|
| 44 | 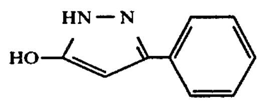 | 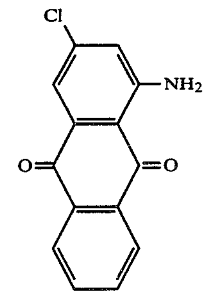 | Orange |
| 45 | 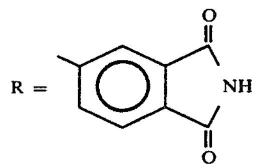 | 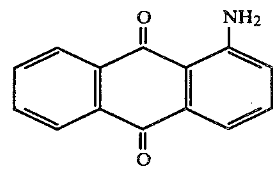 | Orange |
| 46 | 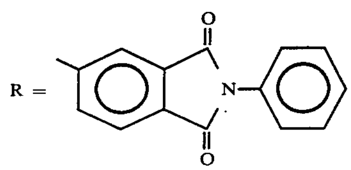 | " | Reddish orange |
| 47 | 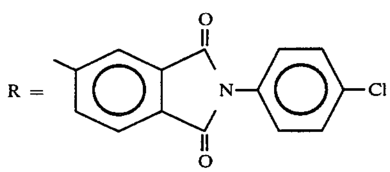 | " | Orange |
| 48 | 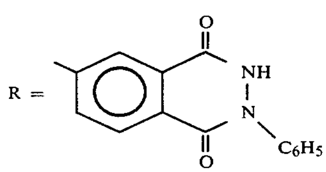 | 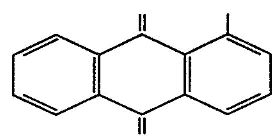 | Yellowish red |
| 49 | 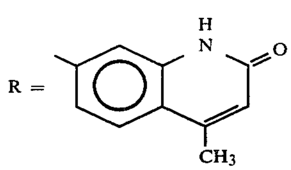 | " | Yellowish red |

EXAMPLE 50 (Use)

(a) Surface coating 10 parts of the colorant obtained in Example 1 and 95 parts of a baking finish mixture containing 70% of coconut alkyd resin (60% strength solution in xylene) and 30% of melamine resin (approximately 55% strength solution in butanol/xylene) are triturated in an attrition mill. After application to a substrate and a baking time of 30 minutes at 120° C., orange full-shade surface coatings of good fastness to light and overspraying are obtained. Yellow brightening effects are obtained by admixing titanium dioxide.

If the colorants described in Examples 2–44 are used, surface coatings with similar orange shades and similar properties are obtained.

(b) Plastic 0.5 part of the colorant obtained in Example 39 is tumbled with 100 parts of polystyrene granules (standard product). The colored granules are homogenized by extrusion at from 190° to 195° C. Orange extrudates of good fastness to light are obtained.

If mixtures of 0.5 part of the colorant and 1 part of titanium dioxide are used, orange colorations of good covering power are obtained.

If the colorants obtained in Examples 35–44 are used, similar colorations are obtained.

(c) Printing ink 8 parts of the colorant obtained in Example 1, 40 parts of a colophonium resin modified with phenol/formaldehyde and from 55 to 65 parts of toluene are intimately mixed in a dispersing unit. An orange toluene-based gravure printing ink is obtained. The prints obtained with this ink have good light-fastness.

Similar results are obtained if the colorants from Examples 2–44 are used.

We claim:

1. A colorant which corresponds to the formula

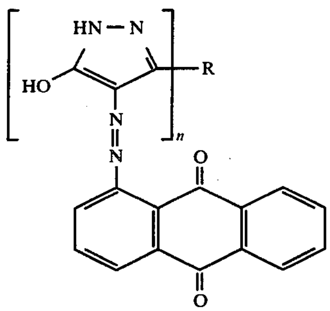

where n=1 and R in phenyl or phenyl independently subtituted by chlorine, bromine, methyl, ethyl, methoxy, ethoxy, acetylamino, benzoylamino or nitro.

2. The colorant of claim 1 wherein n=1 and R is phenyl.

3. The colorant of claim 1 wherein n=1 and R is para-chlorophenyl.

4. The colorant of claim 1 wherein n=1 and R is 2,4-dichlorophenyl.

5. The colorant of claim 1 wherein n=1 and R is para-toluene.

6. The colorant of claim 1 wherein n=1 and R is para-nitrophenyl.

7. The colorant of claim 1 wherein n=1 and R is 4-methoxyphenyl.

8. The colorant of claim 1, wherein R is phenyl substituted by chlorine.

9. The colorant of claim 1, wherein R is phenyl substituted by bromine.

10. The colorant of claim 1, wherein R is phenyl substituted by methyl.

11. The colorant of claim 1, wherein R is phenyl substituted by ethyl.

12. The colorant of claim 1, wherein R is phenyl substituted by methoxy.

13. The colorant of claim 1, wherein R is phenyl substituted by ethoxy.

14. The colorant of claim 1, wherein R is phenyl substituted by acetylamino.

15. The colorant of claim 1, wherein R is phenyl substituted by benzoylamino.

16. The colorant of claim 1, wherein R is phenyl substituted by nitro.

17. The colorant of claim 1 wherein n=1 and R is

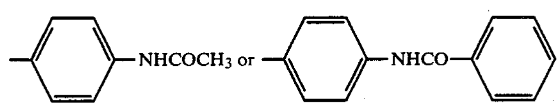

* * * * *